(12) United States Patent
Yasuna et al.

(10) Patent No.: US 6,888,696 B2
(45) Date of Patent: May 3, 2005

(54) MAGNETIC DISK APPARATUS AND SERVO SIGNAL RECORDING METHOD

(75) Inventors: Kei Yasuna, Chiyoda (JP); Takashi Yamaguchi, Tsuchiura (JP); Marutomo Goto, Odawara (JP); Hidehiko Numasato, Odawara (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 380 days.

(21) Appl. No.: 10/041,598

(22) Filed: Jan. 10, 2002

(65) Prior Publication Data

US 2002/0105751 A1 Aug. 8, 2002

(30) Foreign Application Priority Data

Feb. 6, 2001 (JP) ........................................ 2001-028973

(51) Int. Cl.[7] .............................................. G11B 5/596
(52) U.S. Cl. .................................. 360/78.04; 360/77.02
(58) Field of Search ........................ 360/75, 76, 77.01, 360/77.02, 77.06, 77.09, 78.04, 265.1, 77.08

(56) References Cited

U.S. PATENT DOCUMENTS

| | | | | |
|---|---|---|---|---|
| 5,838,514 A | * | 11/1998 | Smith et al. .................. 360/75 |
| 6,005,742 A | * | 12/1999 | Cunningham et al. ... 360/78.05 |
| 6,040,955 A | * | 3/2000 | Brown et al. .................. 360/75 |
| 6,344,942 B1 | * | 2/2002 | Yarmchuk ..................... 360/75 |
| 6,643,082 B1 | * | 11/2003 | Belser .......................... 360/48 |
| 6,704,156 B1 | * | 3/2004 | Baker et al. .................. 360/75 |

FOREIGN PATENT DOCUMENTS

JP        A-8-255448        10/1996

* cited by examiner

Primary Examiner—Sinh Tran
Assistant Examiner—Jason Olson
(74) Attorney, Agent, or Firm—Antonelli, Terry, Stout & Kraus, LLP (57) ABSTRACT

The magnetic disk apparatus includes a magnetic disk for storing thereinto information; a head equipped with a recording conversion element for writing information into the magnetic disk and a reproducing conversion element for reading information from the magnetic disk; an actuator arranged by a suspension for supporting the head so as to move the head on the magnetic disk, and also a drive apparatus for driving the suspension; and a stopper for limiting a movable range of the actuator, whereby a distance between a reproduction element and a recording element is measured and also a track width of the magnetic disk is measured in order to execute a self-servo write operation.

2 Claims, 7 Drawing Sheets

FIG.7B understanding of the present invention, reference is made of a detailed description in conjunction with the accompanying drawings, in which:

MAGNETIC DISK APPARATUS AND SERVO SIGNAL RECORDING METHOD

BACKGROUND OF THE INVENTION

1. Field of the Invention

The present invention generally relates to a magnetic disk apparatus such as a hard disk apparatus. More specifically, the present invention is directed to a servo signal writing operation capable of positioning a head onto a predetermined position on a recording medium.

2. Description of the Related Art

In a general-purpose magnetic disk apparatus equipped with recording/reproduction separation type magnetic resistance head, in order to realize a self-servo write operation capable of recording servo track information without employing an external writing apparatus, such information used as a reference for positioning the magnetic resistance head is required to be grasped with respect to the head provided with this magnetic disk apparatus. This reference information corresponds to a relative distance between a reproducing element and a recording element, and a track width of a magnetic disk, and the like.

As one of the above-described method capable of realizing this self-servo write operation, JP-A-8-255448 discloses such a method that while the servo information which may constitute the reference is previously recorded on a partial region of the recording medium, this pattern is read out so as to acquire the reference information for the head positioning operation. In this conventional method, the pitch amount of the head feed positioning operation is calculated by utilizing the information which has been previously recorded on a predetermined position of the recording medium.

However, in order to realize this method, while using the signal write apparatus which is separately provided with respect to the disk apparatus, the servo signal must be previously recorded on a portion of the recording medium. In other words, this conventional method may impede the merit of the self-servo write operation, namely, such an externally-provided signal write apparatus is not required in the self-servo write operation.

SUMMARY OF THE INVENTION

The present invention has been made to solve the above-described problem, and therefore, has an object to provide a method capable of recording a servo signal on a magnetic disk by employing a recording/reproducing element provided with a magnetic disk apparatus so as to perform a self-servo write operation without requiring recording operation of a provisional servo signal.

To achieve this object, at a first stage for recording a servo signal, while an actuator is depressed against a stopper of an inner peripheral portion of a magnetic disk, a position of a head is adjusted by changing drive force of this actuator, so that a disk radial direction dependent characteristic (will be referred to an "off-track profile" hereinafter) of a reproduction output is measured. Then, a head feed pitch is calculated based upon the acquired track width, and also the acquired relative distance between the recording element and the reproducing element (will be referred to as an "R/W offset" hereinafter). Learning of both the track width and the R/W offset is carried out, while the drive current of the actuator is changed along one direction, so that the adverse influence caused by the elastic deformation hysteresis of the stopper which is depressed against the actuator can be eliminated.

BRIEF DESCRIPTION OF THE DRAWINGS

For a better understanding of the present invention, reference is made of a detailed description in conjunction with the accompanying drawings, in which.

DETAILED DESCRIPTION OF THE EMBODIMENTS

Referring now to FIG. 1 to FIG. 6, a description will be made of such an operation that a servo signal is recorded on a magnetic disk apparatus (will be referred to as a "servo write operation" hereinafter), according to an embodiment of the present invention.

Figure 2:
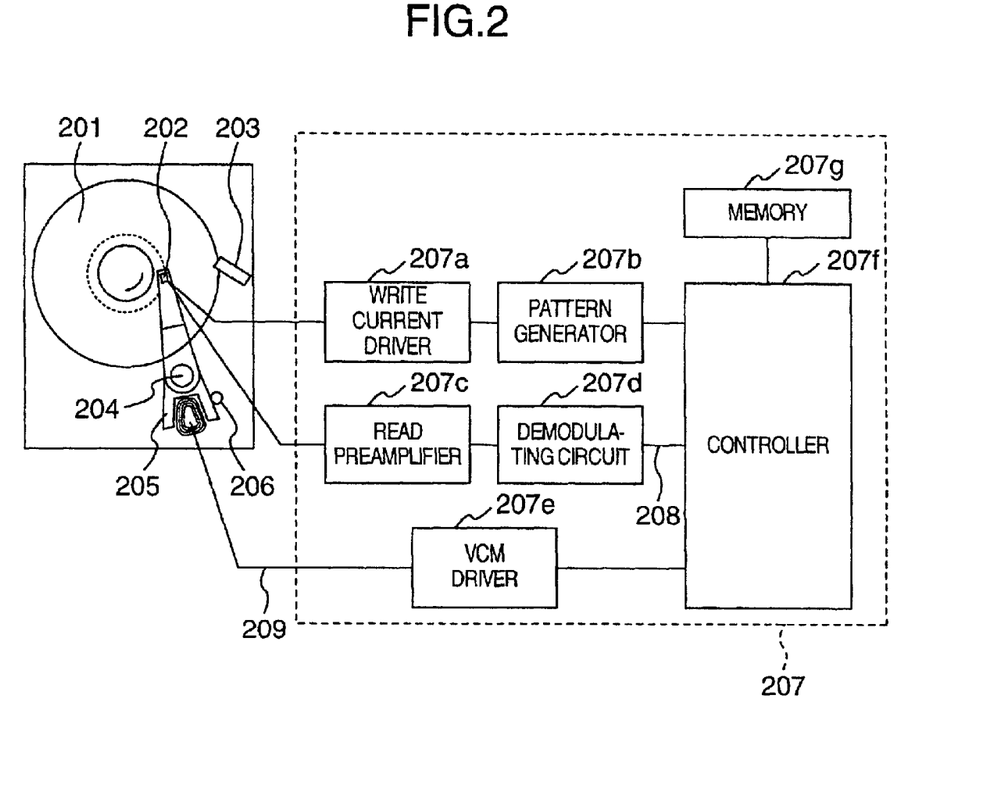
FIG. 2 is a schematic diagram for schematically representing an operation control system of the magnetic disk apparatus according to the embodiment of the present invention when a servo write operation is performed.
Figure 3:
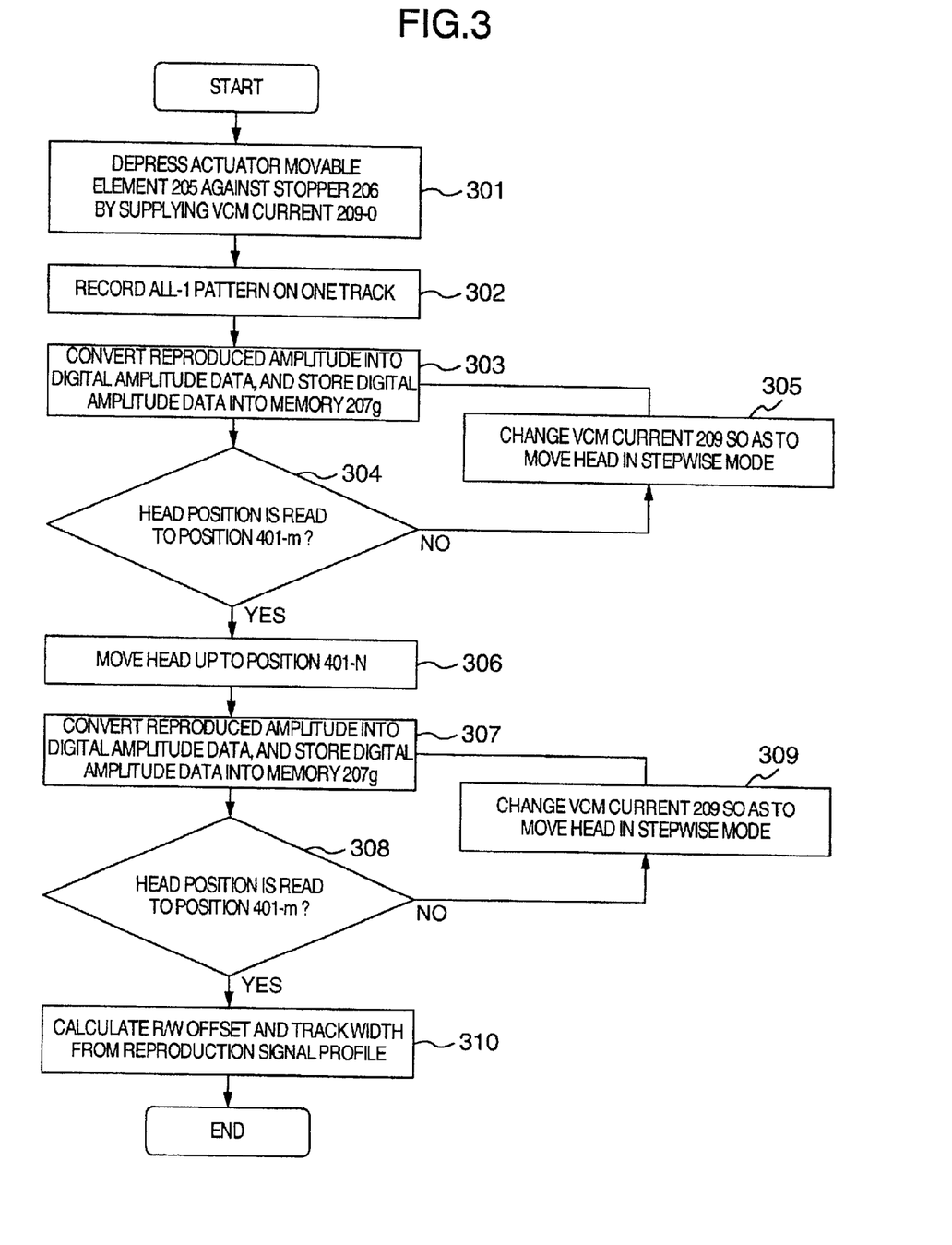
FIG. 3 is a flow chart for explaining a process operation for measuring a track width of a disk and an R/W offset of the head.

FIG. 2 is a schematic diagram for schematically showing a structure of a magnetic disk apparatus according the present invention, and also a signal flow while a servo write operation is carried out. As indicated in FIG. 2, the magnetic disk apparatus of the present invention is equipped with a disk-shaped medium 201 for recording thereon information, and a head 202 for recording/reproducing a signal of the recording medium 201. The head 202 is supported in a rotatable manner around a pivot 204 as a center. This head 202 is moved to an arbitrary radial position on the medium 201 by an actuator 205. In the case that the servo write operation is carried out by this magnetic disk apparatus, an operation controlling circuit 207 is mounted on this magnetic disk apparatus so as to control operations of the head 202, the actuator 205, and the like. It should be noted that the above described operation controlling circuit may be identical to such a control circuit which is employed so as to operate the magnetic disk apparatus as a product. Alternatively, this operation controlling circuit may be separately provided.

The operation controlling circuit 207 is arranged by a write driver 207a, a pattern generating circuit 207b, a preamplifier 207c, a demodulating circuit 207d, a VCM driver 207e, a controller 207f, and a memory 207g. The write driver 207a is used to write a pattern. The preamplifier 207c is used to process a reproduction signal. The VCM driver 207c is employed to drive the actuator 205. The controller 207f controls the functions of these circuit units. The memory 207g is used to store thereinto a parameter required for the servo write operation.

Figure 1:
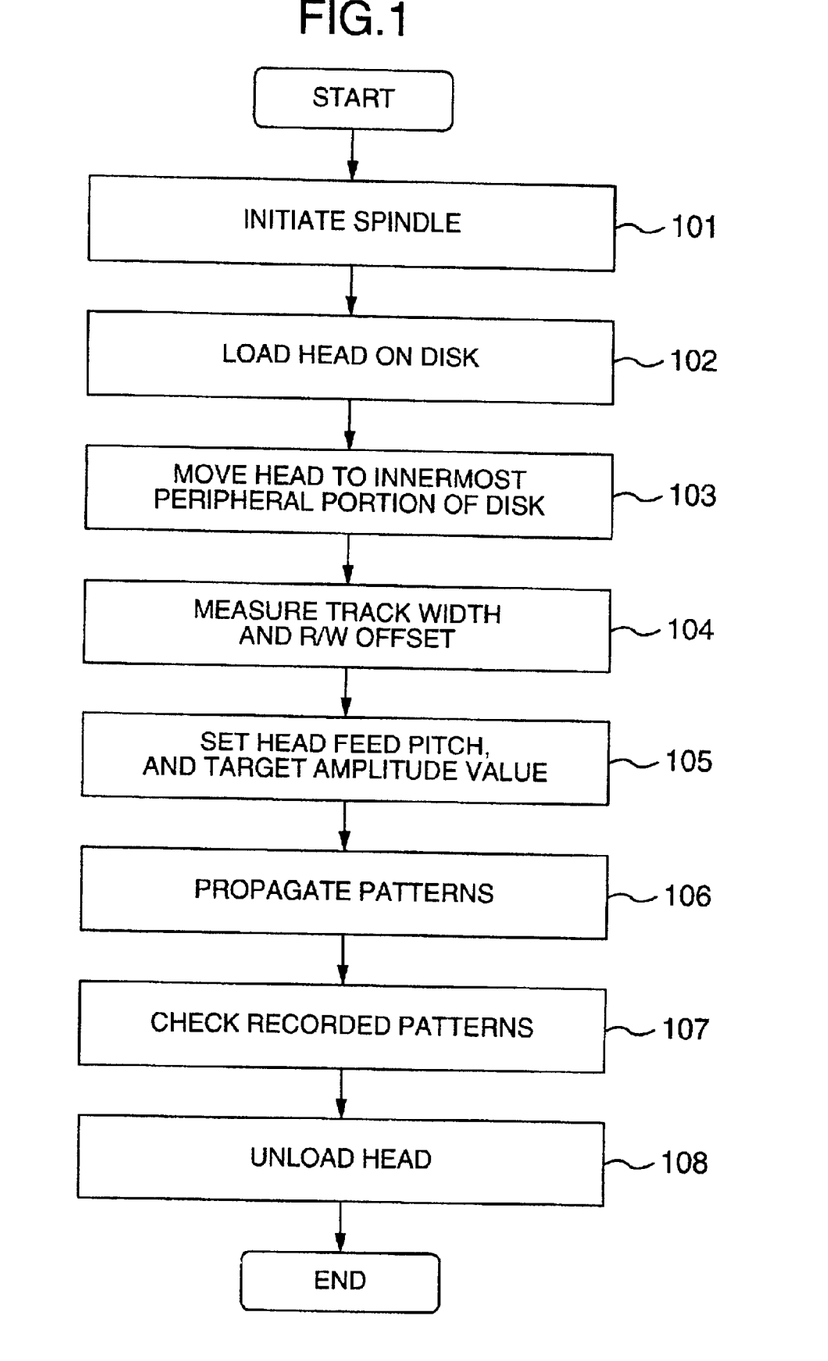
FIG. 1 is a flow chart for describing a process operation of a magnetic disk apparatus, according to an embodiment of the present invention, by which a self-servo write operation is carried out.

In FIG. 1, there is shown a flow chart for describing the servo write operation by the magnetic disk apparatus of the present invention. First, a spindle motor (not shown) is initiated, and then, is rotated until the rotation speed thereof is reached to a preselected rotation speed (step 101). Subsequently, the actuator 205 is driven by the VCM driver 207e so as to load the head 202 from a ramp 202 onto the disk 201 (step 102). At this stage, since a head positioning signal is not recorded on the disk 201, the head 202 cannot detect as to whether or not this head 202 is located at which radial position on the disk 201. As a consequence, in order that the head 202 is located at such an innermost peripheral (circumferential) position on the disk 201 after this head 202 has been located, this head 202 is moved to the inner peripheral side in such a manner that a rotation portion (not shown) of the actuator 205 abuts against a stopper provided on one side (step 103). At this time, while a current 209 supplied to a VCM is made constant, the actuator 205 is depressed to the stopper 206 in order that the position of the head 202 is substantially fixed. Under such a condition that the head 202 is fixed, servo information is recorded by employing a write element. After the servo information has been recorded, a head element is driven at this recording position so as to read a written servo signal. Thereafter, the current value 209 is changed so as to control the position of the head 202 in a fine adjustment mode, and such a servo signal which has been recorded in the beginning is read out by the read element. While the above-explained operation is repeatedly carried out, an offset amount between the read element (reproducing element) and the write element (recording element), and a track width are learned (step 104). Furthermore, a feed pitch is set based upon information as to the measured track width (step 105), and then, a servo pattern is written/propagated every one track (step 106). After the servo patterns have been completely recorded on an entire surface of the disk 201, a check of the servo pattern is carried out (step 107), and the head 202 is unloaded (step 108), so that a series of the above-explained servo write operation is accomplished.

The magnetic disk apparatus of the present invention is featured as follows: That is, at the steps 104 and 105, under such a condition that the positioning signal is not recorded on the disk, while the actuator is depressed against the stopper, the servo signal for one peripheral track of the disk is recorded on this disk by using the write element, and then, the recorded servo signal is read by the read element. Then, since such an operation is repeatedly carried out, this magnetic disk apparatus learns both the offset amount between the recording element and the reproducing element, and the track width. In this operation, while the VCM current is changed so as to move the head position, the firstly recorded servo information is read by the read element under this condition. In other words, since the stopper 206 is formed by an elastic member in this embodiment, this stopper 206 may be deformed by varying the VCM current (namely, depression force is variable).

This operation is very important in order to perform such an operation that patterns which have been recorded on a medium by employing a recording element are read out by way of a reproducing element provided in the same head. This is given by the below-mentioned reason. That is to say, generally speaking, in magnetic heads of a presently-available magnetic disk apparatus, different converting elements are employed as recording elements and reproducing elements, and relative distances between these two different elements own individual fluctuations, which cannot be neglected with respect to track widths. As a result, in such a case that a pattern is recorded on a certain radial position of a medium by employing a recording element, a reproducing element is not always positioned just above this recorded pattern, and thus, the following phenomenon may occur. In this case, if an actuator is not operated after the pattern is recorded, then a head cannot read out the pattern which are been recorded by the own head. In the case that a servo pattern is recorded on a disk, since any information is not recorded on this disk, a head cannot completely acquire information as to a position on this disk. As a consequence, the servo write operation cannot be carried out.

A process operation for learning this offset amount of the recording/reproducing elements and also the effective track width will now be described with reference to FIG. 3 to FIG. 6.

Figure 4:
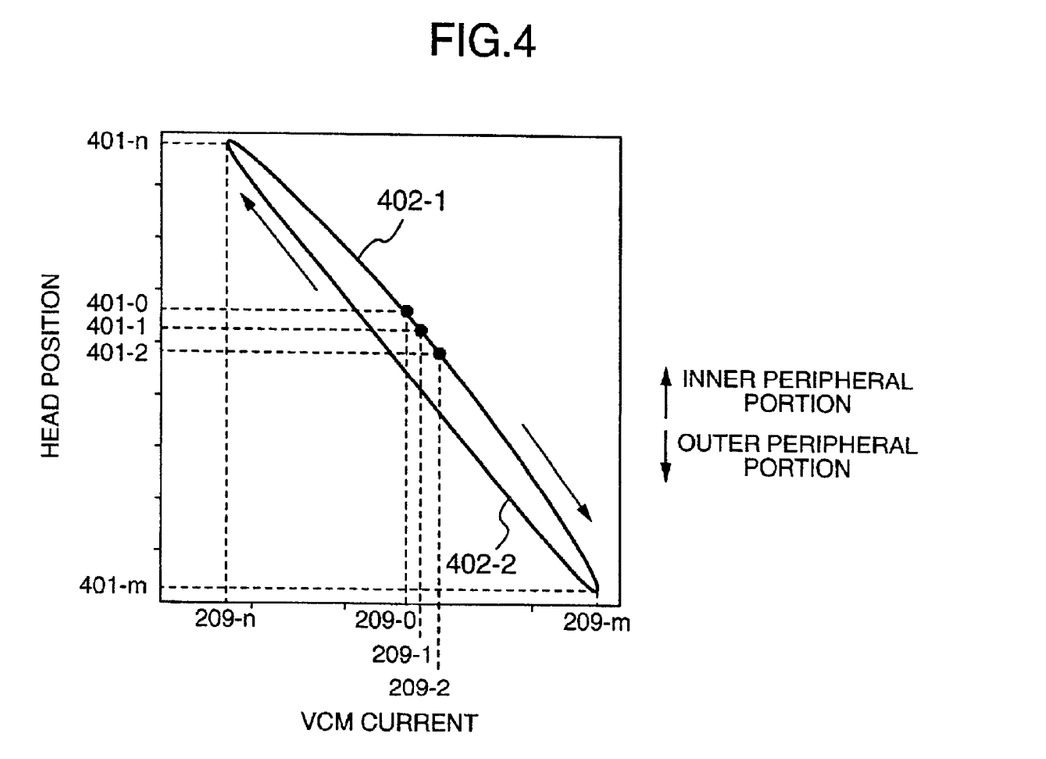
FIG. 4 is a diagram for graphically showing a relationship between a VCM current and a head position.
Figure 5A:
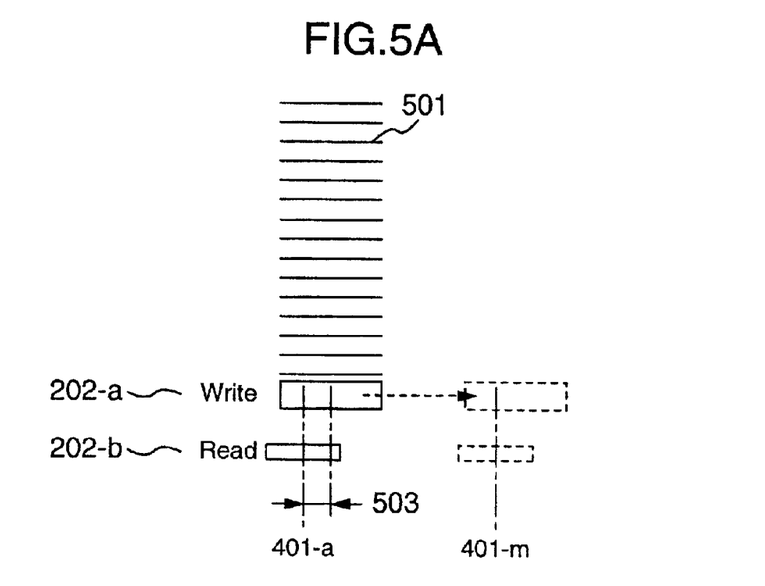
FIGS. 5A and 5B are diagrams for illustratively indicating motion of the head when the track width and the R/W offset are measured.
Figure 5B:
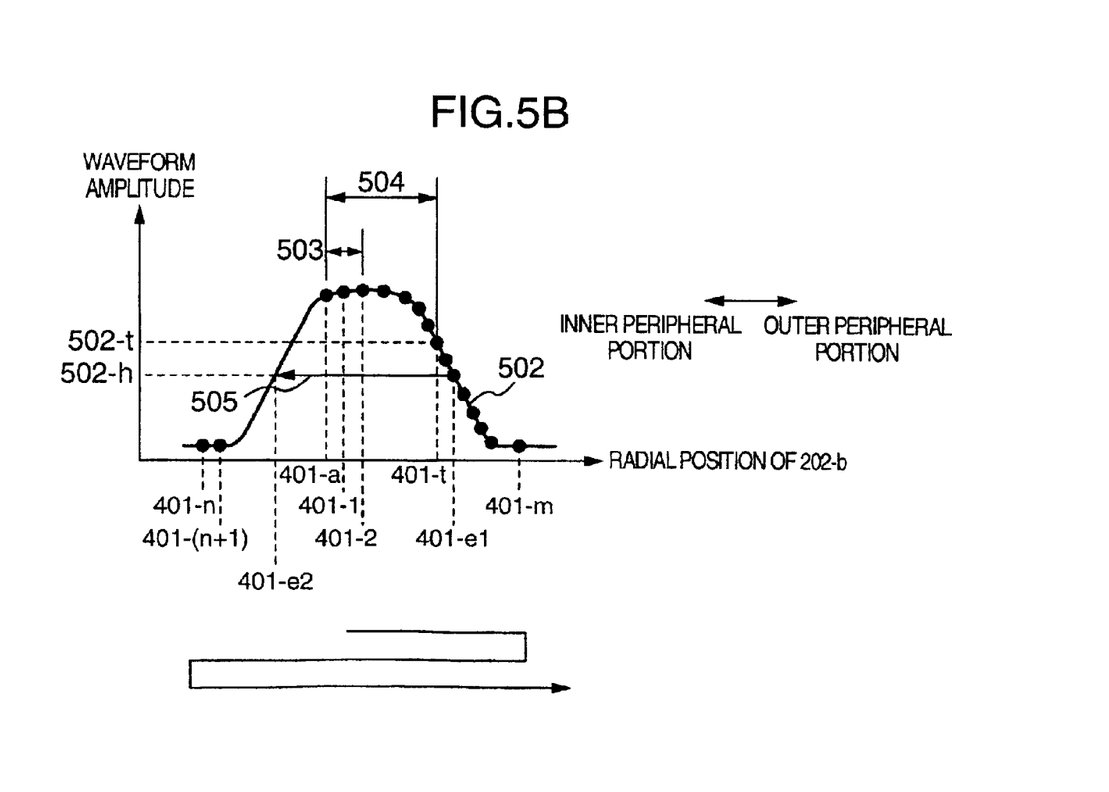

First, at the step 103 shown in FIG. 1, the actuator 205 is moved until this actuator 205 is made contact with the stopper 206. This stopper 206 is provided in order that the head 202 is located at the innermost peripheral position. Thereafter, a DC current having a certain constant value is supplied to the VCM in order that the actuator is depressed against the stopper (step 301). At this time, the value of the current supplied to the VCM is assumed as 209-0. Under this condition, the recording element is driven so as to record such a pattern (A11-1 pattern) having a constant frequency over one peripheral portion on the recording medium 201 (step 302). Then, the reproducing element is operated in order to read out the recorded pattern and then to store the read pattern into the memory 207g. Next, the current supplied to the VCM is decreased in a stepwise manner so as to move the head to the outer peripheral side. FIG. 4 shows a relationship between the VCM current and the radial position of the head at this time. At a step 302, the current value of the VCM used when the pattern is recorded on the disk at the step 302 is sequentially decreased from 209-0 via 209-1 up to 209-2, so that the position of the head is moved from 401-0 via 401-1 to 401-2 on the outer peripheral side. Every time the position of the head is changed, the reproducing element is driven so as to read out the recorded pattern to store the read pattern into the memory (step 303). FIGS. 5A and 5B represent a relationship between the radial position of the head and the amplitude of the reproduction signal. As previously, the amplitudes of the signals which are reproduced at the respective stages where the head is moved are converted into digital values by the demodulating circuit 207d, and then, are stored into the memory 207g under control of the controller 207f.

While the VCM current value is reduced up to a preset current value "209-m", the head is moved to "401-m" (FIG. 5A), and thereafter, the VCM current value is increased up to a preset current value "209-n" in order that the head is moved to a position "401-n" of the inner peripheral side (step 304). While the VCM current value is again decreased from the preset current value "209-n" to another current value "209-(n+1)" in a stepwise manner, the head is moved to such a position where the amplitude of the reproduced signal becomes maximum, and the amplitudes of the respective steps are converted into digital values by the demodulating circuit 207d. Then, these digital values are stored into the memory (step 305). Since the process operations defined from the step 301 up to the step 305 are carried out, an off-track profile of the reproduced amplitudes as indicated by reference numeral 502 in FIG. 5B is acquired. Based upon the acquired off-track profile, a calculation is made of both an offset amount 503 of the recording/reproducing elements provided with the head, and a track width 505 (step 306).

As apparent from the foregoing descriptions, it is so required that the stopper 206 is formed by such an elastic member that as previously described, while the current value of the VCM is changed, the position of the head is changed in a substantially linear manner.

With respect to an offset amount of the recording/reproducing elements, if there is no offset between the recording element and the reproducing element, then a peak signal could be reproduced at the same position. To the contrary, as indicated in FIG. 5B, when there is such an offset between the recording element and the reproducing element, positions where the reproducing element reads out the peak value of the pattern recorded by the recording element are different from each other. As a consequence, when the recording element records a pattern, the reproducing element reads out information about this recorded pattern, and then, while the position of the head is slightly shifted, the information recorded by the recording element is read by the reproducing element so as to acquire the information patterns. Then, a move amount of the head up to such a position that the information pattern becomes peak is calculated as an offset amount. In general, a magnetic track width may be typically represented by a distance between two points where an amplitude becomes 50% of a maximum amplitude value in an offset profile. To this end, first of all, while values stored in the memory as the off-track profile are compared with a value of 50% of the maximum amplitude value (namely, reference numeral 502-$h$ shown in FIG. 5B) one by one, values stored in the memory, which correspond to the profile of the outer peripheral side of the disk are sequentially investigated from such a point 401-2 where the amplitude becomes maximum. Then, such a point "401-$e1$" where the amplitude firstly becomes smaller than 50% is assumed as an edge position of the track of the outer peripheral side. Similarly, the values stored in the memory are sequentially investigated also as to the inner peripheral side of the disk, and thus, another edge position "401-$e2$" of the track of the inner peripheral side is obtained. Then, the track width 505 is calculated based upon a distance between both the acquired edge positions of the tracks.

Next, a description will now be made of an operation for calculating a head feed pitch at the step 105 in detail with reference to FIGS. 5A and 5B. At the step 106, the head is offset by a predetermined amount from the previously recorded pattern so as to read a new track on the disk, so that the patterns are written/propagated. This offset motion of the head is carried out by such a positioning manner that the amplitude of the signal produced by reproducing the previously recorded track becomes a certain target value. An amplitude value used as a target value may depend upon such a fact as to how to set a ratio of the track width of the head to the track pitch. In this embodiment, the track pitch is set to 125% of the measured track width 505, and a half of this track pitch is set as the head feed pitch 504. In this case, the target amplitude value used when the head is fed so as to write/propagate the pattern may be determined as an amplitude "502-$t$" defined from a write position 401-$a$ up to a position 401-$t$ on the outer peripheral side by both an R/W offset 503 and a feed pitch amount 504 in the offtrack profile 502.

Figure 6A:
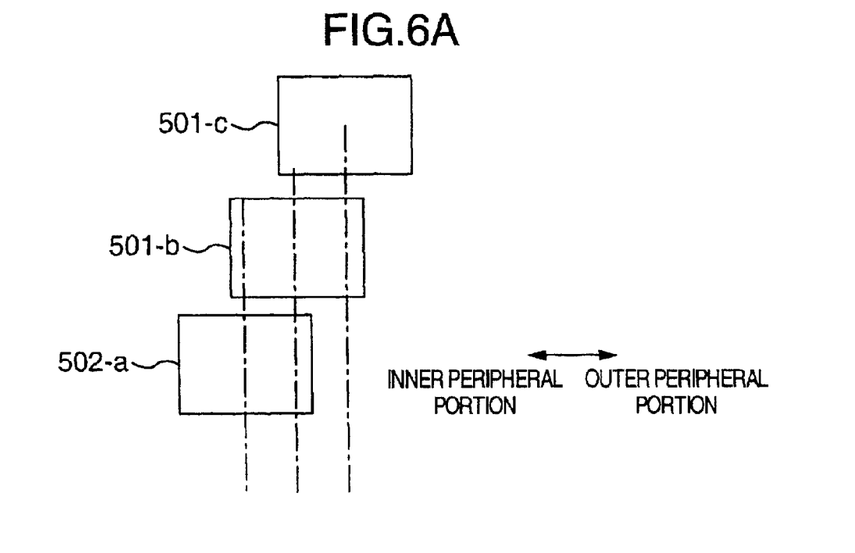
FIGS. 6A, 6B and 6C are illustrations for illustratively indicating a method for calculating a head feed pitch.
Figure 6B:
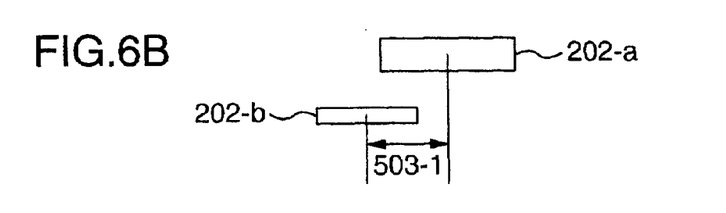
Figure 6C:
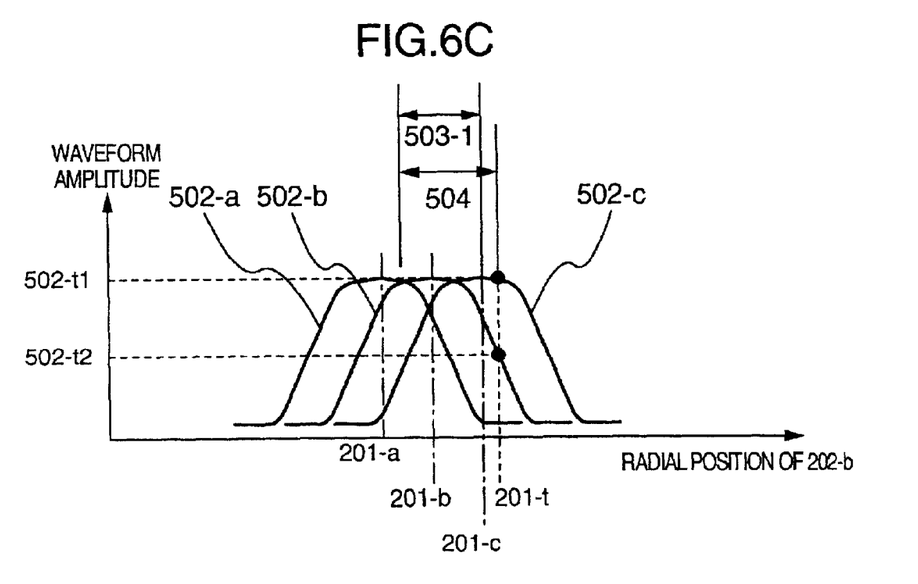

Referring now to FIGS. 6A, 6B and 6C, a further method for determining the target amplitude value will be explained. In FIG. 6B, for instance, in the case that the R/W offset 503-1 is large, as compared with the track width 505, when the recording element is offset in order to feed the head by the set feed pitch amount 504, a target amplitude value becomes "502-$t1$." In this case, even when the position along the radial direction is changed, the amplitude is not changed, but also cannot be used as such an amplitude value for a positioning target. To avoid this difficulty, while the head is previously moved in the stepwise mode toward the outer peripheral side from a step 303 up to a step 305, such patterns 501-$b$ and 501-$c$ as indicated as an upper portion of FIG. 6A are recorded at a radial position 401-$a$ in addition to a plurality of radial positions 401-$b$ and 401-$b$ which are separated from each other in an equi-interval in such a manner that the patterns 501-$b$ and 501-$c$ are not overlapped with each other along the peripheral direction. This pattern is subdivided by time, while a rotation index is employed as a reference, and amplitudes are separately acquired, so that off-track profiles 502$a$, 502$b$, and 502-$c$ of the respective patterns are obtained, as shown in FIG. 6C.

With respect to such a head in which the offset amount between the recording/reproducing elements is large, in the case that the head is further offset from the off-track profile 502-$c$ so as to newly write/propagate the patterns, since such a pattern using a reproduction signal for detecting a position of the head is selected to be 501-$b$, a target amplitude value becomes 502-$t2$ on the off-track profile 502-6, and thus, the positioning operation of the head can be carried out. Thereafter, the positioning operation of the head in order to write/propagate the pattern after the step 106 may be carried out by not utilizing a reproduced amplitude of such a pattern which has been recorded just before this head positioning operation, but by utilizing a reproduced amplitude of such a pattern which was recorded at one preceding step.

As previously explained, learning of the above-described off-track profile is carried out as follows. That is, since the magnitude of the DC current supplied to the VCM is changed, the force of the actuator depressed against the stopper is changed, and thus, the position of the head is adjusted in the fine mode. A relationship between this VCM current value and the head position may depends upon a deformation characteristic of the stopper 206. As to an actual stopper, generally speaking, a relationship between a value of a current supplied to the VCM and a position of the head cannot constitute a complete linear relationship, but may constitute a non-linear characteristic. Also, hysteresis of the head position with respect to a change in depression force cannot be actually neglected.

Figure 7A:
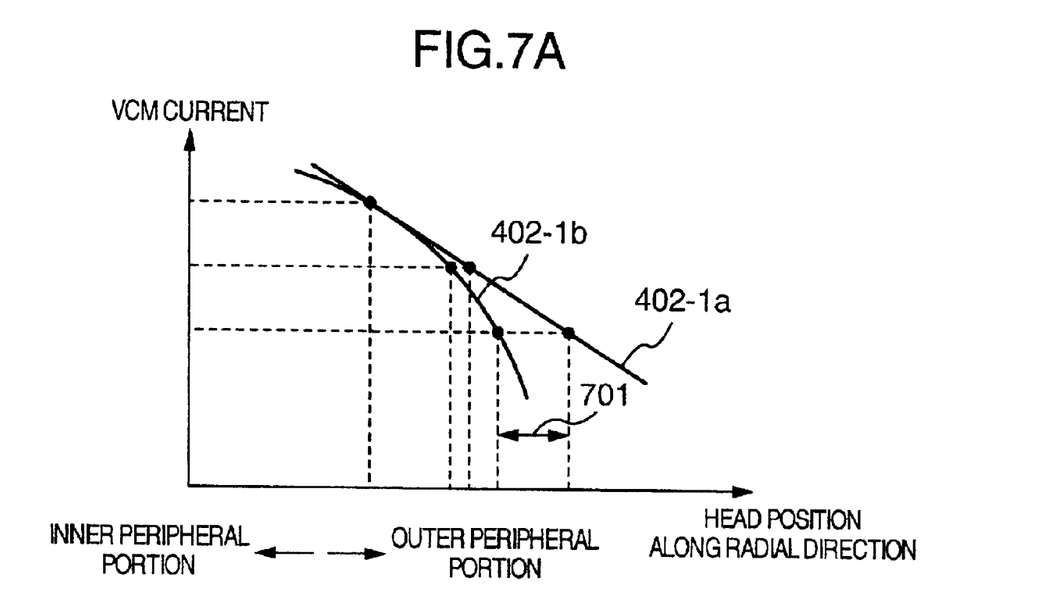
FIGS. 7A and 7B are diagrams for representing both a VCM current capable of depressing an actuator against a stopper, and an adverse influence of a non-linear characteristic of a head position.
Figure 7B:
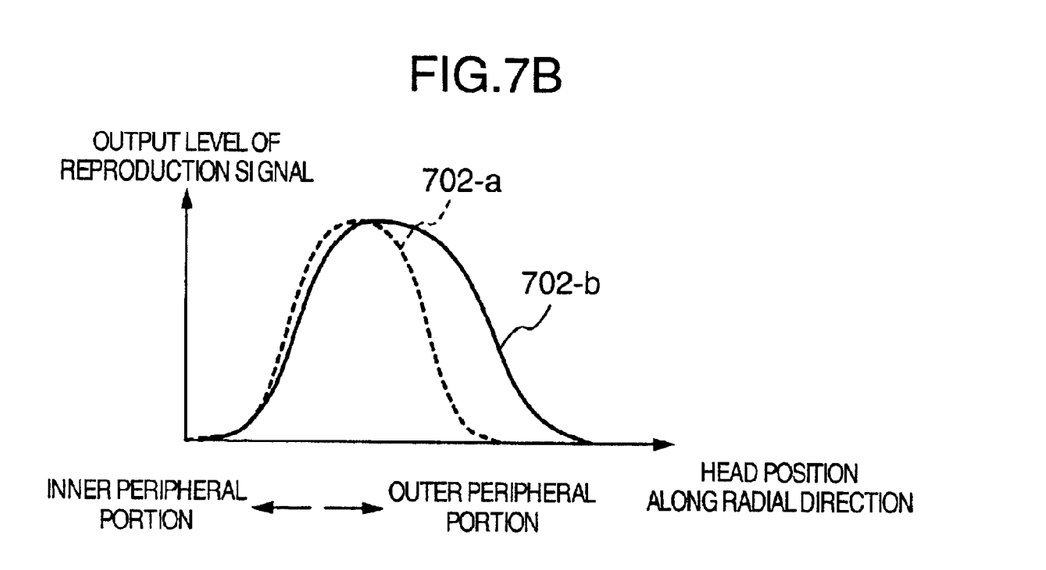

Referring now to FIG. 4 and FIGS. 7A and 7B, an adverse influence caused by these errors will be explained. In the previous drawing of FIG. 4, when the head is moved toward the outer peripheral portion of the disk, the head position passes through the path of 402-2, whereas when the head is moved toward the inner peripheral portion thereof, the head position passes through another path 402-2. When the off-track profile is learned, a measurement is performed as to a correspondence relationship between the VCM current value and the amplitude of the reproduction signal corresponding to the head position. As a result, if there are the above-explained non-linear element and also hysteresis in the deformation characteristic of the stopper, then the off-track profile to be learned contains an error, and therefore, this may cause an error in the track pitch.

In order to mitigate the adverse influence of these error factors, the below-mentioned method according to the present invention may be carried out, while considering the following points.

A first technical point of this method is featured by that the amplitude detecting operation while the above-described learning of the off-track profile is performed is carried out at such a stage when the head is moved from the inner peripheral side to the outer peripheral side. In other words, as to the outer peripheral side from the write position 401-0 shown in FIG. 4, while the head is moved along a direction from this write position 401-0 toward another write position 401-m, an amplitude of a reproduction signal is measured. Also, as to the inner peripheral side from the write position 401-0, while the head is moved along the direction from the write position 401-n to the write position 401-0, an amplitude of a reproduction signal is measured. As a result, the respective positions of this head obtained while the amplitudes of the reproduction signals are measured are located on the path 602-a defined from the inner peripheral portion to the outer peripheral portion. The relationship between the VCM current value and the head position shown in FIG. 4 corresponds to such an actually measured result that while the actuator is depressed against a cylindrical-shaped elastic member and then the VCM current is changed, the head positions are measured. It can be understood that the paths where the head move directions are identical to each other can be reproduced in high precision. As a result, even when there is such hysteresis, this hysteresis does not cause the error factor when the off-track file is measured.

A second technical point of this method is featured by that while the deformation characteristic of the stopper is adjusted, the relationship between the VCM current value (namely, actuator drive force) and the head position may suppress a variation of gradations within a certain allowable range. Referring now to FIGS. 7A and 7B, a description will be made of an error which is contained in the head feed pitch in the case that there is a variation in the gradient between this VCM current value and the head position. FIG. 7A is a diagram for representing a relationship bet VCM current values and head positions in the case that there is a variation in gradients (402-1a), and also in the case that there is no variation in gradients (402-1b). When there is such a variation in the gradients as indicated by a curve line 402-1b, an error is produced only by 701 between the actual head position and such a head position which is expected by the VCM current value. As a result, also, as to the off-track profile learned at the step 104, a measured profile contains such an error as indicated by 702-b with respect to the actual profile 702-a (see FIG. 7B). As a result, the calculated head feed pitch is shifted from a proper pitch value, so that the track pitch is shifted from the designed value.

In general, since an allowable error in a track pitch is selected to be on the order of +5% to −5% in view of recording/reproducing operations of a magnetic disk apparatus, a variation of gradients is limited to such a range defined from +10% up to −10%. As a consequence, a servo signal may be recorded on a magnetic disk of such a magnetic disk apparatus in allowable precision as to recording/reproducing operations of this magnetic disk apparatus.

Since the above-described method of the present invention is carried out, the servo signal can be recorded at the correctly managed track pitch, while the auxiliary servo signal is not recorded on the recording medium.

It will be further understood by those skilled in the art that the foregoing description has been made on embodiments of the invention and that various changes and modifications may be made in the invention without departing from the spirit of the invention and scope of the appended claims.

What is claimed is:

1. A magnetic head apparatus comprising:

a magnetic disk for storing thereinto information;

a head equipped with a recording conversion element for writing information into the magnetic disk and a reproducing conversion element for reading information from the magnetic disk;

an actuator arranged by a suspension for supporting the head so as to move the head on the magnetic disk, and also a drive apparatus for driving the suspension; and a stopper for limiting a movable range of the actuator; wherein;

the stopper is formed by an elastic member;

an elastic deformation amount of the stopper is changed by changing force of driving the actuator under such a condition that the actuator is depressed against the stopper in order that the position of said head is adjusted, and a positional dependent characteristic along a radial direction of the magnetic disk as to a reproduction output of the head is measured; and a relationship between a magnitude of drive force capable of depressing the actuator against the stopper and a position of the head along a width direction thereof is defined by that a variation of gradients is limited to 10% within a range of two tracks of the magnetic disk.

2. A method for recording a servo signal on a magnetic disk apparatus comprised of: a magnetic disk for storing thereinto information; a head equipped with a recording conversion element for writing information into the magnetic disk and a reproducing conversion element for reading information from the magnetic disk; an actuator arranged by a suspension for supporting the head so as to move the head on the magnetic disk, and also a drive apparatus for driving the suspension; and a stopper for limiting a movable range of the actuator; wherein:

at such a stage that a servo signal is recorded on the magnetic disk where information used to position the head has not yet been recorded, an elastic deformation amount of the stopper is changed by varying force of driving the actuator under such a condition that said actuator is depressed against the stopper so as to change a position of said head in a stepwise mode, and also to record patterns having finite lengths which are not overlapped with each other at a plurality of radial positions.

* * * * *